United States Patent [19]

Weaver

[11] Patent Number: 4,986,006

[45] Date of Patent: Jan. 22, 1991

[54] APPARATUS FOR LOCATING A CONNECTOR PLATE OR THE LIKE

[76] Inventor: Austin S. Weaver, 6620 - 96th Ave., Zeeland, Mich. 49464

[21] Appl. No.: 473,277

[22] Filed: Jan. 31, 1990

[51] Int. Cl.[5] .......................... F16B 15/00; G01D 21/00

[52] U.S. Cl. .......................................... 33/613; 411/468

[58] Field of Search .................. 52/105, 735, 715, 712, 52/DIG. 6, 749; 33/613; 411/457, 461, 466, 468; 269/904, 910

[56] References Cited

U.S. PATENT DOCUMENTS 2,996,721 8/1961 Black .............................. 269/910 X 4,343,580 8/1982 Moyer et al. ........................ 411/468

*Primary Examiner*—Harry N. Haroian

*Attorney, Agent, or Firm*—Varnum, Riddering, Schmidt & Howlett

[57] ABSTRACT

A locator for accurately positioning a connector plate in a predetermined location on a jig for interconnecting structural members that are to be assembled in the jig. The locator comprises a base which supports the locator on the jig. The base has at least one opening therethrough for mounting the locator to the jig and at least one retaining tab projecting from the base. The retainer tab is adapted to cooperate with the connector plate to retain the connector plate in a predetermined position relative to the locator during the assembly of the structural members in the jig.

10 Claims, 2 Drawing Sheets

APPARATUS FOR LOCATING A CONNECTOR PLATE OR THE LIKE

BACKGROUND OF THE INVENTION

This invention relates to connector plates and, more particularly, to a device for accurately locating and positioning a connector plate with respect to adjacent members that are to be connected.

In many industries involving the construction of wood products, it is necessary to join together two or more adjacent wood members. Such applications arise in constructing furniture, trusses, pallets and the like. For example, to facilitate rapid construction of residential and commercial properties, roof trusses are often assembled in advance and shipped to the construction site where they are incorporated into the building, such trusses commonly being referred to as preengineered trusses. Assembly of these trusses requires joining together in an abutting relationship various wood members such as bottom chords, top chords, and web members such as verticals and diagonals, these members sometimes being known as, respectively, joists, rafters, struts and vertical posts. The adjacent wood members are secured together through the use of connector plates, nailer plates, gang-nail plates, truss plates or the like. These plates generally comprise a flat base having a plurality of teeth stamped therefrom, each tooth extending substantially perpendicularly relative to the base and functioning as a nail. In a typical assembly procedure, a connector plate is placed on a jig table, the wood members to be joined are positioned on the table and overlying the connector plate, a second connector plate is placed above the wood members and aligned over the first connector plate, and pressure is applied to the connector plates to securely engage them with the wood members. The connector plate teeth penetrate the wood members to securely mount the plate to the wood members thereby holding the wood members in an assembled relationship.

However, the connector plates, and especially the first connector plate placed directly on the jig table, have a tendency to slip or move from their desired location before they can be secured to the wood members. Thus, the connector plates may not be centered relative to the wood members to be joined, as is desired for an effective connection. The resulting truss may have an inherent weakness in that the connector plate is off-center relative to the members to be joined. Thus, it would be desirable to have an apparatus for accurately locating and retaining a connector plate relative to the wood members to be joined before the connector plate is secured to the wood members.

SUMMARY OF THE INVENTION

This invention relates to a locator means for accurately positioning a connector plate in a predetermined location on a jig, the connector plate being employed to interconnect a plurality of structural members that are to be assembled in the jig. The locator means comprises a base adapted to support the locator means on the jig. The base includes means for mounting or affixing the locator means to the jig and retaining means that cooperates with the connector plate to retain the connector plate in a predetermined position relative to the locator means during the assembly of the structural members in the jig. The retaining means may comprise at least one retaining tab that projects from the base, the tab being adapted to be received in an aperture formed in the connector plate. In another embodiment, the retaining means may comprise a pair of retaining tabs that project upwardly from the base and which are adapted to be received in a corresponding pair of apertures formed in the connector plate. Preferably, the pair of retaining tabs are spaced apart a distance substantially equal to the distance between a pair of apertures in the connector plate. The means for mounting the locator means to the jig may comprise an opening formed through the base and adapted to receive mechanical fastening means.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
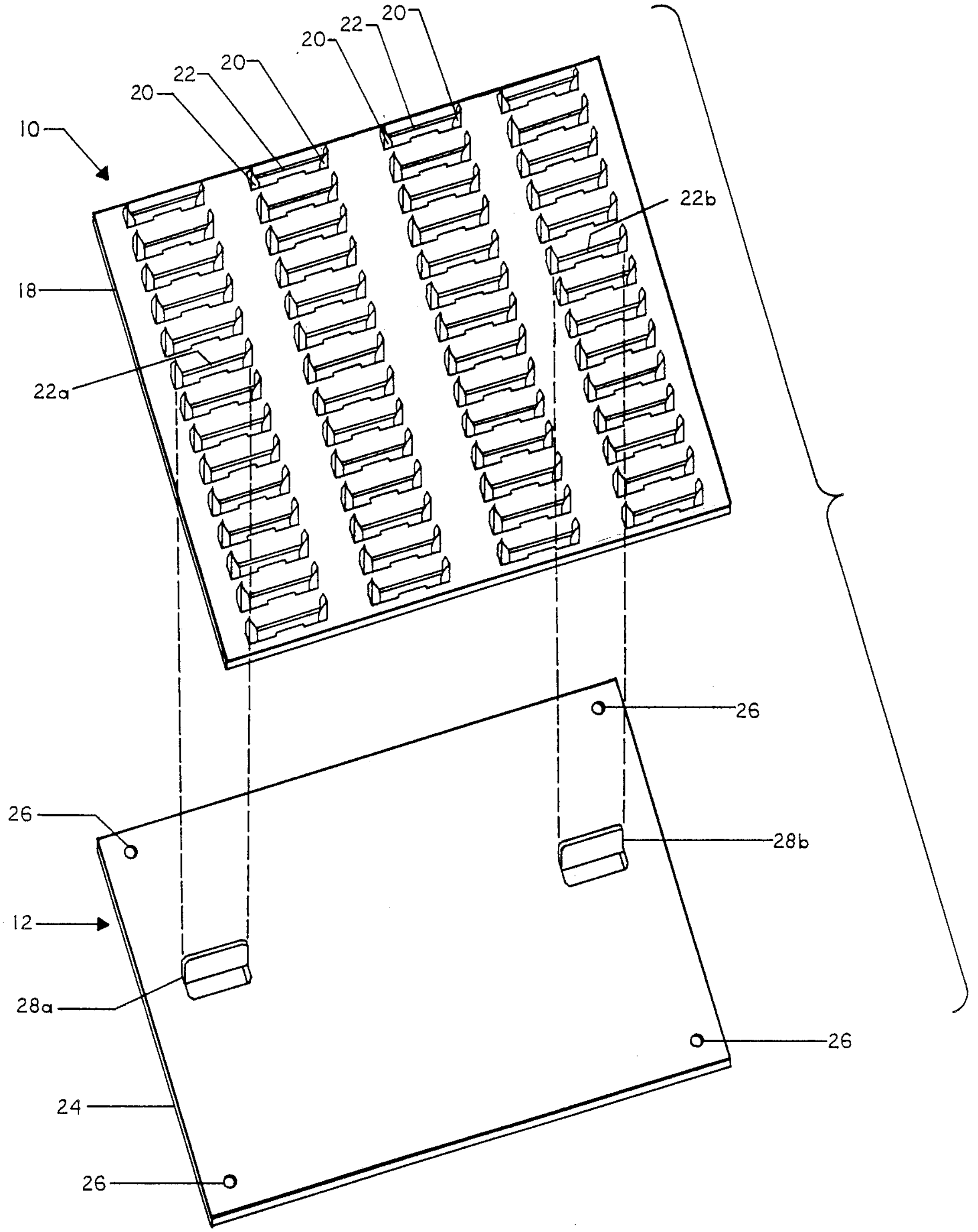
FIG. 1 is an exploded perspective view of a connector plate and an apparatus for locating the connector plate according to the invention.
Figure 2:
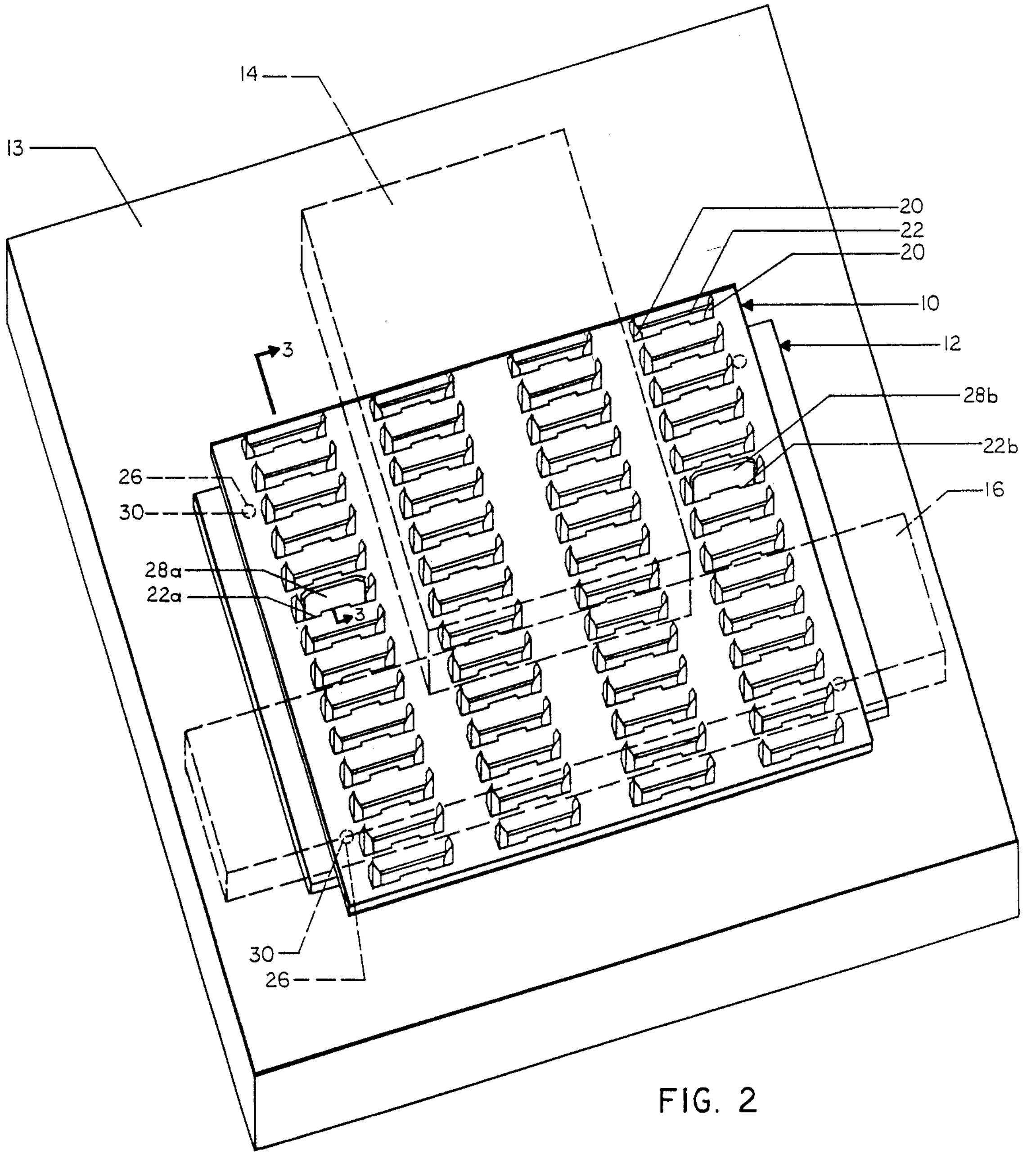
FIG. 2 is a perspective view of the connector plate and the apparatus for locating the connector plate of FIG. 1 in an assembled configuration.

Turning now to the drawings and in particular to FIGS. 1 and 2, a connector plate 10 is shown in conjunction with a device or apparatus 12 for locating the connector plate 10, which device may be referred to hereinafter as "a locator plate," and a jig table or jig 13. As noted hereinabove in the Background, a connector plate is a frequently used means for securing together two adjacent wood structural members such as the wood members 14, 16 shown schematically in broken lines in FIG. 2. As can be seen in FIG. 2, the wood members 14, 16 are in an abutting relationship and are secured together by the connector plate 10. It will be understood that in the arrangement illustrated in FIG. 2, the table 13 supports the locator plate 12 which in turn supports the connector plate 10 which in turn engages the wood members 14, 16. It may be desirable to have a connector plate 10 positioned to each side of the wood members 14, 16 thereby enhancing the strength of the connection, although only a single connector plate 10 is shown.

Figure 3:
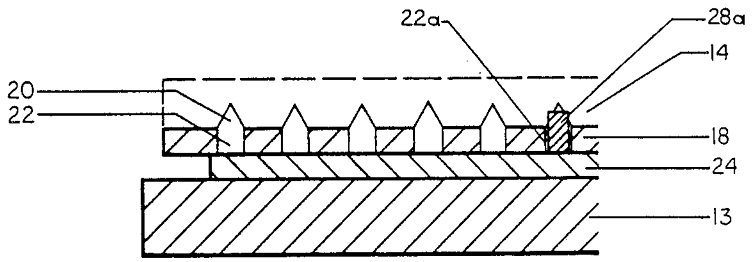
FIG. 3 is a sectional view taken along lines 3--3 of FIG. 2.

The connector plate 10 shown in FIGS. 1 to 3 comprises a flat base 18 having a plurality of sharpened teeth 20 stamped therefrom and extending in a direction substantially perpendicular to the base. The teeth 20 are arranged in parallel rows with apertures 22 formed between adjacent teeth by the stamping operation. Each tooth 20 functions as a nail or mechanical fastener and may penetrate at least one of the wood members 14, 16 to be connected, thereby securely mounting the connector plate 10 to the wood members and assembling the wood members to each other. The term "connector plate" as used herein refers to any mechanical connection device having a plurality of teethlike or naillike projections which penetrate and engage the members to be connected thereby securing the connection device to the members and assembling the members together. Connector plates are often referred to as nailer plates, gang-nail plates, truss plates or the like. The size of the connector plate 10 as well as the shape, size and orientation of both the teeth 20 and the apertures 22 may be varied according to the particular use for which the connector plate is intended. For example, the teeth 20 and the apertures 22 may be arranged in offsetting rows, that is, an arrangement wherein each row of teeth 20 is only parallel to alternating or every other row rather than parallel to every row including adjacent rows. It will be understood that the connector plate 10 as well as the jig table 13 and the wood members 14, 16 form no part of the invention's broader aspects and are illustrated merely for the purpose of describing an application in which the locator plate 12 may find use.

The locator plate 12 includes a flat, generally planar, base 24 having a mounting hole 26 formed in each corner thereof and a pair of retaining tabs 28*a*, 28*b* that are substantially perpendicular to the flat base. Preferably, the tabs 28*a*, 28*b* are stamped from the base 24. The spacing between the tabs 28*a*, 28*b* is such so as to correspond substantially with the spacing between two adjacent connector plate apertures 22 such as the apertures 22*a*, 22*b*, the significance of which is explained more fully hereinbelow.

In operation, the locator plate 12 is mounted to a jig table 13 or the like by mounting the plate to the table with nails, screws or other mechanical fasteners 30 that are received in the mounting holes 26 and which engage the jig table. The connector plate 10 is engaged with the locator plate 12 by the registration of the retaining tabs 28*a*, 28*b* with, respectively, the connector plate apertures 22*a*, 22*b*. The spacing between the tabs 28*a*, 28*b* is such that registration of the tabs with the pair of adjacent connector plate apertures 22*a*, 22*b* is facilitated. The wood members 14, 16 are placed on the jig table 13 and over the connector plate 10. A second connector plate 10 (not shown separately in the drawings) may be placed on the opposite sides of the wood members 14, 16. The connector plate or plates 10 are secured to the wood members 14, 16 in conventional fashion such as by the application of pressure to the wood members. The teeth 20 penetrate the wood members 14, 16 to securely assemble the wood members together. Once the connector plate 10 has been secured to the wood members 14, 16, the entire assembly comprising the plate 10 and the wood members may be removed from the jig table 13 while leaving the locator plate 12 secured thereto. Thus, the locator plate 12 is available for receiving and retaining another connector plate 10 for the assembly of other wood members in similar fashion.

By fixedly securing the locator plate 12 to the jig table 13 and then mounting the connector plate to the locator plate 10, the location, orientation and position of the connector plate is similarly fixed with respect to the jig table. Thus, when the wood members 14, 16 to be joined are positioned on the jig table 13, the connector plate 10 is accurately and properly located, centered and aligned relative to the wood members, thereby insuring effective and accurate engagement of the connector plate with the wood members. Because the locator plate 12 retains the connector plate 10, the connector plate is not capable of being moved or shifted relative to the jig table 13 and, therefore, relative to the wood members 14, 16 before the connector plate is secured to the wood members.

It will be understood by those having ordinary skill in the art that connector plates of various design are known. The size of the plate, the spacing between the teeth, and the size and the shape of the apertures between adjacent teeth may be varied without affecting the function of the connector plate. The locator plate 12 may be similarly modified by adjusting the shape of the retainer tabs 28 and the spacing therebetween so as to be engageable with a connector plate of different design.

Reasonable variations or modifications are possible within the spirit of the foregoing specification and drawings without departing from the scope of the invention which is defined in the accompanying claims.

What is claimed is:

1. A locator means for accurately positioning a connector plate in a predetermined location on a jig for interconnecting a plurality of structural members to be assembled in the jig, the locator means comprising a base adapted to support the locator means on the jig and having mounting means for affixing the locator means to the jig, and retaining means provided on the base to cooperate with the connector plate to retain the connector plate in a predetermined position relative to the locator means during assembly of structural members in the jig.

2. A locator means according to claim 1, wherein the retaining means comprises at least one retaining tab projecting from the base.

3. A locator means according to claim 2, wherein the retaining tab is adapted to be received in an aperture formed in the connector plate.

4. A locator means according to claim 3, wherein the retaining tab extends substantially perpendicularly from the base.

5. A locator means according to claim 4, wherein the mounting means comprises in the base defining at least one opening therethrough adapted to receive mechanical fastening means.

6. A locator means according to claim 1 for a connector plate having a plurality of apertures formed therein, wherein the retaining means comprises a pair of retaining tabs projecting upwardly from the base and adapted to be received in a corresponding pair of apertures formed in the connector plate.

7. A locator means according to claim 6, wherein the retaining tabs are spaced apart a distance substantially equal to the distance between adjacent ones of the plurality of apertures formed in the connector plate.

8. .A locator plate for accurately positioning a connector plate defining a plurality of apertures in a predetermined location on a jig for interconnecting a plurality of structural members to be assembled in the jig, the locator plate comprising a base having a planar lower surface for supporting the locator plate on a surface of a jig, the base being provided with mounting means for affixing the locator plate to the jig surface, and a pair of retainer tabs extending upwardly from the base and formed to be received in a pair of the apertures of the connector plate.

9. A locator plate according to claim 8, wherein the mounting means comprises at least one opening formed in the base and adapted to receive a fastener therethrough.

10. A locator plate according to claim 8, wherein the retainer tabs extend integrally from the material of the base.

* * * * *